US005135670A

United States Patent [19]
Johnson et al.

[11] Patent Number: 5,135,670
[45] Date of Patent: Aug. 4, 1992

[54] SULFURIZED OLEFIN EXTREME PRESSURE/ANTIWEAR ADDITIVES AND COMPOSITIONS THEREOF

[75] Inventors: Douglas E. Johnson, Pennington; Andrew G. Horodysky; William F. Olszewski, both of Cherry Hill, all of N.J.

[73] Assignee: Mobil Oil Corporation, Fairfax, Va.

[21] Appl. No.: 542,342

[22] Filed: Jun. 22, 1990

[51] Int. Cl.⁵ .............. C10M 105/70; C10M 143/06
[52] U.S. Cl. .................................... 252/45; 252/46.4
[58] Field of Search .............................. 252/45, 46.4

[56] References Cited

U.S. PATENT DOCUMENTS 4,344,854  8/1982  Davis et al. .............................. 252/45
4,795,576  1/1989  Born et al. .............................. 252/45
4,904,402  2/1990  Audeh ................................... 252/46.4

Primary Examiner—Brian E. Hearn
Assistant Examiner—M. Nuzzolillo
Attorney, Agent, or Firm—Alexander J. McKillop; Charles J. Speciale; Howard M. Flournoy

[57] ABSTRACT

Reaction products of sulfur, olefins and sodium sulfide hydrates are improved extreme-pressure/antiwear additives for lubricants and liquid hydrocarbyl fuels.

10 Claims, No Drawings

SULFURIZED OLEFIN EXTREME PRESSURE/ANTIWEAR ADDITIVES AND COMPOSITIONS THEREOF

BACKGROUND OF THE INVENTION

This application is directed to a novel method of preparing sulfurized olefins and to lubricant and fuel compositions containing same.

The use of sulfurized olefins has been well-known for their extreme-pressure and antiwear properties when formulated into lubricants, as exemplified by U.S. Pat. No. 3,703,504 (Horodysky).

Sulfurized olefin compositions have been prepared by, for example, the reaction of sulfur, isobutylene, and hydrogen sulfide as exemplified by U.S. Pat. No. 4,344,854 (Davis and Holden).

It has now been found that the reaction of sulfur, olefins, and sodium sulfide hydrates produces a sulfurized olefin mixture with no, or decreased amounts of, dithiolethiones and no halogens. These reaction products possess excellent extreme-pressure and antiwear properties, reduced color, odor, and corrosivity towards copper when compared to sulfurized olefin mixtures produced by direct reaction of an olefin with sulfur, in the absence of sodium sulfide. No other reference suggests the direct sulfurization of olefins with elemental sulfur and alkali metal sulfide.

Exceptional benefits are expected for a variety of synthetic and mineral oil applications from the sulfurized olefins produced in the novel method of this invention. The lubricant compositions disclosed are believed to be novel. It is also likely that the unexpected performance properties of these reaction products may also find use in hydrocarbon and/or alcohol-containing fuel compositions. These compositions to the best of applicants' knowledge and belief have not been previously used as extreme-pressure/antiwear additives in lubricating oils, greases, or fuel applications. Additional benefits include antifatique, antiscoring, friction reducing, thermal stabilizing and antioxidant properties.

SUMMARY OF THE INVENTION

Sulfurized olefins prepared by prereacting elemental sulfur and alkali-metal sulfide hydrates and then reacting the resultant sulfur-sulfide with a suitable olefin provide improved extreme pressure/antiwear properties to lubricant and fuel compositions when incorporated therein. Accordingly, the application is more particularly directed to lubricant compositions comprising oils of lubricating viscosity or greases prepared therefrom and to fuel compositions comprising liquid hydrocarbyl fuels and minor antiwear/extreme pressure amounts of sulfurized olefins prepared as disclosed herein.

DESCRIPTION OF PREFERRED EMBODIMENTS

The sulfurized olefins in accordance with the invention are generally prepared by initially reacting sulfur and an alkali-metal sulfide hydrate such as sodium sulfide nonahydrate in a high pressure reactor. An olefin such as isobutylene is then added and the mixture stirred and heated. The sulfurized olefin mixture is recovered, washed with water, and dried to produce a liquid containing from about 35 to 60% sulfur. This liquid contains a mixture of di-tert-butyl polysulfides.

Isobutylene is a preferred olefin, other butylenes, pentenes, propene, or oligomers of the above or mixtures of same and similar olefins having from 2 to about 32 carbon atoms can be used. The mole ratio between sulfur plus sulfide, and olefin may range from about 5:1 to about 1:1.

Sodium sulfide nonahydrate is preferred, however, other alkali metal sulfide hydrates such as sodium sulfide hydrates, containing less or more water, may be employed. Water may be added to a water-deficient alkali metal sulfide hydrate to provide a stoichiometric equivalent to sodium sulfide nonahydrate. Water in excess of that required for the sodium sulfide nonohydrate stoichiometry may be present. The mole ratio between sulfur and sulfide may range from 10:1 to 0.5:1.

The pre-reaction between sulfur and the sulfide is critical. The reaction with isobutylene, for example, is extremely sluggish, requiring elevated reaction temperatures and prolonged reaction times if the pre-reaction between sulfur and alkali metal sulfide hydrates in the absence of isobutylene is omitted.

Optionally, the olefin such as isobutylene can be reacted with a hydrated polysulfide, for example, sodium polysulfide, which can be obtained by reaction of hydrated sodium sulfide with elemental sulfur.

The reaction between sulfur and sulfide takes place at temperatures varying from about 185° to about 500° F., pressures varying from about 100 to about 850 psi with reaction times varying from 0.5 up to about 24 hours or more. Preferred are temperatures varying from about 200° to about 400° F., pressures, preferably from 350 to 550 psi and reaction times from about 0.5 to 22 hours or less.

The reaction between olefin and sulfur, plus sulfide may be carried out at the same or somewhat lower or higher temperatures and pressures. Reaction times may be the same or more or less than the pre-reaction times.

The additives may be incorporated into any suitable lubricating media or liquid fuel. Suitable lubricating media comprise oils of lubricating viscosity, e.g., mineral or synthetic; or mixtures of mineral and synthetic or greases in which the aforementioned oils are employed as a vehicle or into such functional fluids as hydraulic fluids, brake fluids, power transmission fluids, gear oils, and the like.

In general, mineral oils and/or synthetic oils, employed as the lubricant oil, or grease vehicle, may be of any suitable lubricating viscosity range, as for example, from about 45 SSU at 100° F. to about 6000 SSU at 100° F., and, preferably, from about 50 to about 250 SSU at 210° F. These oils may have viscosity indices from below zero to about 100 or higher. The average molecular weight of these oils may range from about 250 to about 800. Where the lubricant is to be employed in the form of a grease, the lubricating oil is generally employed in an amount sufficient to balance the total grease composition, after accounting for the desired quantity of the thickening agent and other additive components to be included in the grease formulation. When high temperature stability is not a requirement of the finished grease, mineral oils having a viscosity of at least 40 SSU at 150° F., and particularly those falling within the range from about 60 SSU to about 6,000 SSU at 100° F. may be employed.

In instances where synthetic oils are employed as the vehicle for the grease in preference to mineral oils, or in combination therewith, various compounds may be successfully utilized. Typical synthetic vehicles include polyisobutylene, polybutenes, hydrogenated polydecenes, polypropylene glycol, polyethylene glycol, trimethylolpropane esters, neopentyl and pentaerythritol esters, di(2-ethylhexyl) sebacate, di(2-ethylhexyl) adipate, dibutyl phthalate, fluorocarbons, silicate esters, silanes, esters of phosphorous-containing acids, liquid ureas, ferrocene derivatives, hydrogenated mineral oils, chain-type polyphenyls, siloxanes and silicones (polysiloxanes), alkyl-substituted diphenyl ethers typified by a butyl-substituted bis-(p-phenoxy phenyl) ether, phenoxy phenylethers, etc., including alkylated aromatics.

Fully formulated lubricating oils may include in addition to the additives disclosed herein a variety of other additives (for their known purpose) such as dispersants, detergents, inhibitors, antiwear agents, antioxidant, antifoam, antirust, pour point depressants, deemulsifiers and other additives including phenates, salicylates, succinimides, esters, amides, hindered phenols, arylamines, alkyl amines, phosphonates, sulfonates and zinc dithiophosphates.

The lubricating vehicles of the improved greases of the present invention, containing the above described additives, are combined with a grease forming quantity of a thickening agent. For this purpose, a wide variety of materials dispersed in the lubricating vehicle in grease-forming quantities in such degree as to impart to the resulting grease composition the desired consistency. Exemplary of the thickening agents that may be employed in the grease formulation are non-soap thickeners, such as surface-modified clays and silicas, aryl ureas, calcium complexes and similar materials. In general, grease thickeners may be employed which do not melt and dissolve when used at the required temperature within a particular environment; soap thickeners such as metallic (lithium or calcium) soaps including hydroxy stearate and/or stearate soaps can be used. However, in all other respects, any material which is normally employed for thickening or gelling hydrocarbon fluids or forming greases can be used in preparing the aforementioned improved greases in accordance with the present invention.

Included among the preferred thickening agents are those containing at least a portion of alkali metal, alkaline earth metal or amine soaps of hydroxyl-containing fatty acids, fatty glycerides and fatty esters having from 12 to about 30 carbon atoms per molecule. The metals are typified by sodium, lithium, calcium and barium. Preferred is lithium. Other thickening agents include salt and salt-soap complexes as calcium stearate-acetate (U.S. Pat. No. 2,197,263), barium stearate acetate (U.S. Pat. No. 2,564,561), calcium, stearate-caprylate-acetate complexes (U.S. Pat. No. 2,999,065), calcium caprylate-acetate (U.S. Patent No. 2,999,066), and calcium salts and and soaps of low-, intermediate- and high-molecular weight acids and of nut oil acids.

As has been disclosed hereinabove, the reaction products are useful as multifunctional antiwear agents, and may have added antioxidant and stabilizing properties, and enhanced copper corrosivity characteristics. The products in accordance with the invention are added to the lubricating medium in amounts sufficient to impart such properties thereto. More particularly, such properties will be imparted to the lubricant by adding from about 0.001% to about 10% by weight, preferably from about 0.01% to about 3%, of the neat product.

The liquid fuels contemplated include liquid hydrocarbons, such as gasoline, fuel oils, distillate fuels and diesel oil and liquid alcohols such as methyl alcohol and ethyl alcohol and naphthols and ethers. The fuels also include mixtures of alcohols as well as mixtures of alcohols and liquid hydrocarbons such as gasohol. The additives of the this invention may be conveniently added to the fuels in amounts varying from about 25 to 250 pounds of additive per thousand barrels of fuel.

The following examples are exemplary only and are not meant to be limitations of the present invention.

EXAMPLE 1

Sulfurization Using Sodium Sulfide Nonahydrate

A two-liter pressure reactor was charged with sulfur (183.5 g, 5.72 moles) and sodium sulfide nonahydrate (152.7 g, 0.636 moles), sealed, and flushed three times by pressurizing with nitrogen (500 psi) followed by venting. The contents were heated with slow stirring to 400° F. for 30 minutes, then cooled to 284° F. Isobutylene (300 ml 3.18 moles) was added and the stirring rate was increased while maintaining the temperature at 284° F. After six hours, the remaining volatile reactants were vented and the mixture was cooled to room temperature. The mixture was taken up in methylene chloride (250 ml), vacuum filtered, washed with water (3×1 liter), dried over anhydrous magnesium sulfate, and filtered through diatomaceous earth. The methylene chloride was removed at reduced pressure (85° C., 23" Hg vacuum) to give a liquid product (222.9 g).

The product did not contain any dithiolethione as evidenced by the absence of a peak in the infrared spectrum at 910 cm$^{-1}$ The infrared spectrum indicated that the product contained a mixture of di-tert butyl polysulfides.

EXAMPLE 2

Sulfurization Using a Low Water Content Sodium Sulfide

A two-liter pressure reactor was charged with sulfur (183.5 g, 5.72 moles), sodium sulfide (54.4% water, approximately Na$_2$S:5.18 H$_2$O, 102.4 g, 0.636 moles), and water (44 ml, 2.42 moles), then sealed, and flushed three times by pressurizing with nitrogen (500 psi) and venting. The reactor contents were heated to 400° F. with slow stirring for two hours, then cooled to 260° F. Isobutylene (300 ml, 3.18 moles) was added and the reaction vigorously stirred for 17 hours at 260° F. Excess pressure was released and the reactor cooled to room temperature. The product mixture was vacuum filtered to separate a water soluble solid from an organic liquid. The liquid was dissolved in methylene chloride (250 ml), washed with water (3×1 liter), dried over anhydrous magnesium sulfate and vacuum filtered. The methylene chloride was evaporated under reduced pressure to provide a liquid product (226.9 g).

The product did not contain any dithiolethione as evidenced by the absence of a peak in the infrared spectrum at 910cm$^{-1}$ cm. The infrared spectrum indicated that the product contained mixture of di-tert-butyl polysulfides.

EXAMPLE 3

Sulfurization Using Sodium Sulfide Nonahydrate

A one-gallon pressure reactor reactor was charged with sulfur (266.7 g, 8.32 moles) and sodium sulfide nonahydrate (500 g, 2.08 moles), sealed, and flushed three times by pressurizing with nitrogen (500 psi) followed by venting. The contents were heated to 160.C (320.F) for 22 hours, then cooled to room temperature.

Isobutylene (500 ml, 5.30 moles) was added and the reactor was reheated to 160° C. Heating was continued for at least seven and one-half hours. The temperature was adjusted to 100 C. (212.F), excess pressure was vented, and the reactor purged with a stream of nitrogen for one hour. The reactor was allowed to cool to room temperature. The contents were vacuum filtered through paper and the liquid material washed with four equal volumes of water. The product was dried over anhydrous magnesium sulfate and vacuum filtered to give a light orange liquid (225.3 g).

Sulfur Analysis: 40.46%

The product contained only a small amount of dithiolethione as evidenced by the peak in the infrared spectrum at 910 cm$^{-1}$. The infrared spectrum indicated that the product also contained mixture of di-tert-butyl polysulfides.

Evaluation of the Product

The product of Example 3 and Comparative Example A, a sulfurized olefin, prepared by direct reaction of sulfur and isobutylene in the absence of sodium sulfide, were dissolved in a solvent paraffinic neutral lubricating oil to provide 1% by weight solutions. Copper strips were heated at 250° C. for three hours and rated for corrosion in accordance with ASTM D-130. See Table 1 below:

TABLE 1

| | |
|---|---|
| Example 3: | 2b |
| Comparative Example A | 4b |
| Direct Sulfurization: | |
| (in absence of sodium sulfide) | |

Comparative Example A also contains an undesirably high level of isobutylene-derived dithiolethiones, leading to (a) high volatility and resulting vaporization at high temperatures, (b) very high color levels, often appearing black even at low additive concentrations, and (c) high propensity for undesirable staining while in service. Example 3 does not exhibit these very undesirable properties of Comparative Example A.

The product of Example 3 was dissolved in a 80%/20% mixture of solvent paraffinic bright and solvent paraffinic neutral lubricating oils to provide a solution which was 1% sulfur by weight. This solution was examined in accordance with the Four Ball Extreme-Pressure Test (ASTM D-2783). The data are shown in Table 2.

TABLE 2

| | Weld Load (kg) | Load Wear Index |
|---|---|---|
| Base Oil | 160 | 21.8 |
| Base Oil + Example 3 | 400 | 62.5 |

The above results demonstrate the good extreme pressure/antiwear activity of the compositions of this invention.

The compositions of the invention generally contain a portion of di-tert-butyl polysulfides. Some of the products may also contain small amounts (but functionally inconsequential) of the undesirable dithiolethione derived from isobutylene.

The use of additive concentrations of low dithiolethione or dithiolethione-free sulfurized isobutylene in premium quality automotive and industrial lubricants will significantly increase their performance, improve the stability, and extend the service life. These novel compositions described herein are useful at low concentrations and do not contain any potentially undesirable metals or phosphorus.

What is claimed:

1. A process for preparing a product of reaction, having no or substantially no dithiolethiones, suitable for use in oils of lubricating viscosity or greases prepared therefrom comprising (a) reacting (a) elemental sulfur and an alkali metal sulfide or (b) alkali metal sulfide hydrate or mixture thereof in a molar ratio of sulfur to sulfide, ranging from about 10.1 to about 0.5:1, at pressures varying from about 100 to about 850 psi, at temperatures ranging from about 185° to about 500° F. and times ranging from about 0.5 hours to about 24 hours or more and thereafter (2) reacting the product of (1) and $C_2$ to about a $C_{32}$ olefin or mixture of olefins in a molar ratio of sulfur plus sulfide to olefin of from about 5:1 to about 1:1 at the same or slightly lower or higher temperatures, pressures and reaction times, and recovering a liquid product having about 35% to 60% by weight sulfur.

2. The process of claim 1 wherein the alkali metal sulfide hydrate is a sodium sulfide hydrate.

3. The process of claim 2 wherein said hydrate is sodium sulfide nonahydrate.

4. The process of claim 1 wherein the alkali metal sulfide hydrate is a hydrated sodium polysulfide.

5. The process of claim 1 comprising reacting in step (1) a mixture of an alkali metal sulfide, elemental sulfur and added water.

6. The process of claim 5 wherein said sulfide is sodium sulfide.

7. The process of claim 1 wherein the olefin is selected from butylene, pentenes and propenes.

8. The process of claim 7 wherein the olefin is isobutylene.

9. The process of claim 1 wherein the product of reaction comprises a mixture of di-tert-butyl polysulfides.

10. The process of claim 1 wherein the temperature varies from about 200° to about 400° F. and pressure varies from about 350 to about 550 psi.

* * * * *